UNITED STATES PATENT OFFICE.

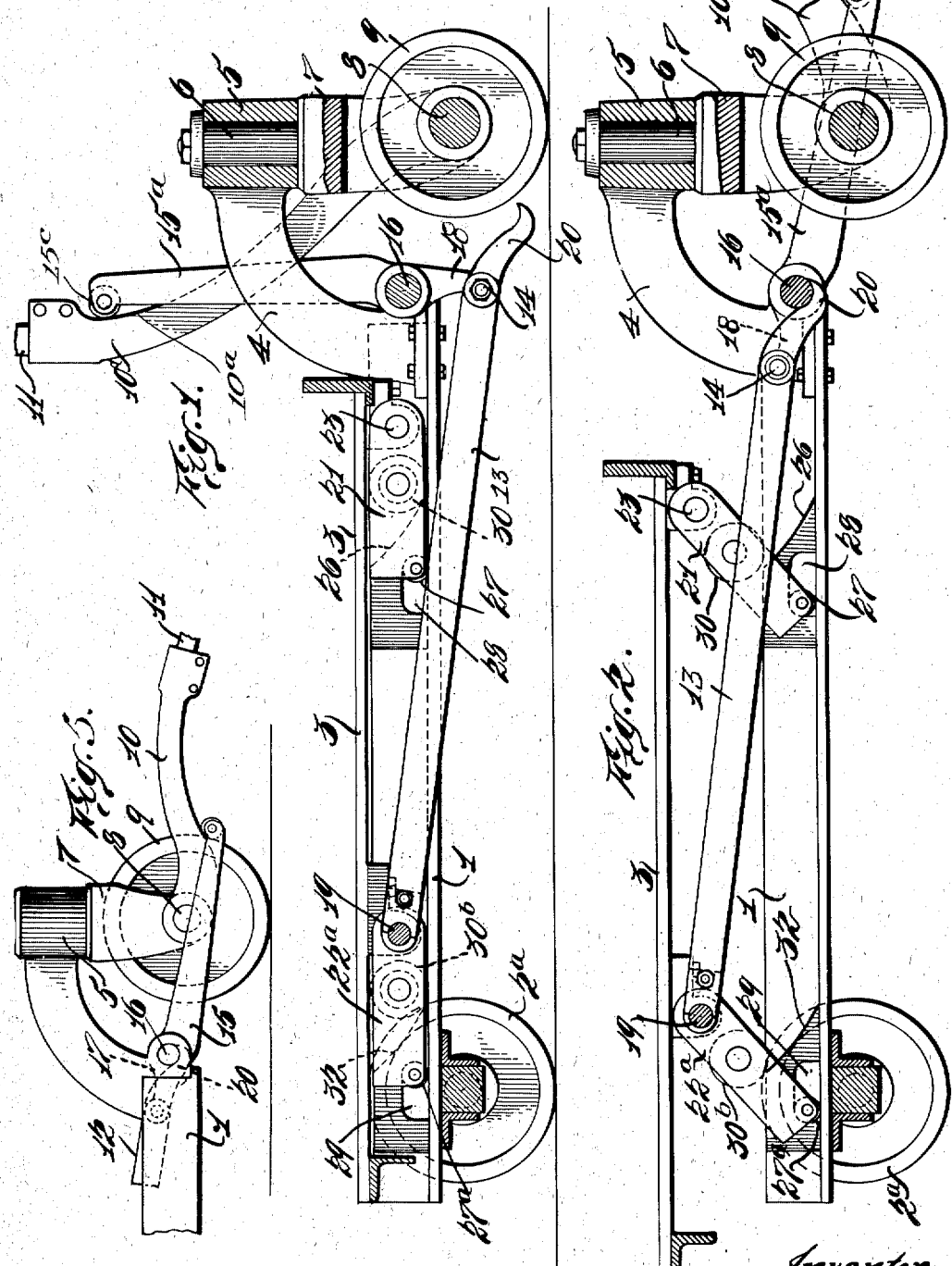

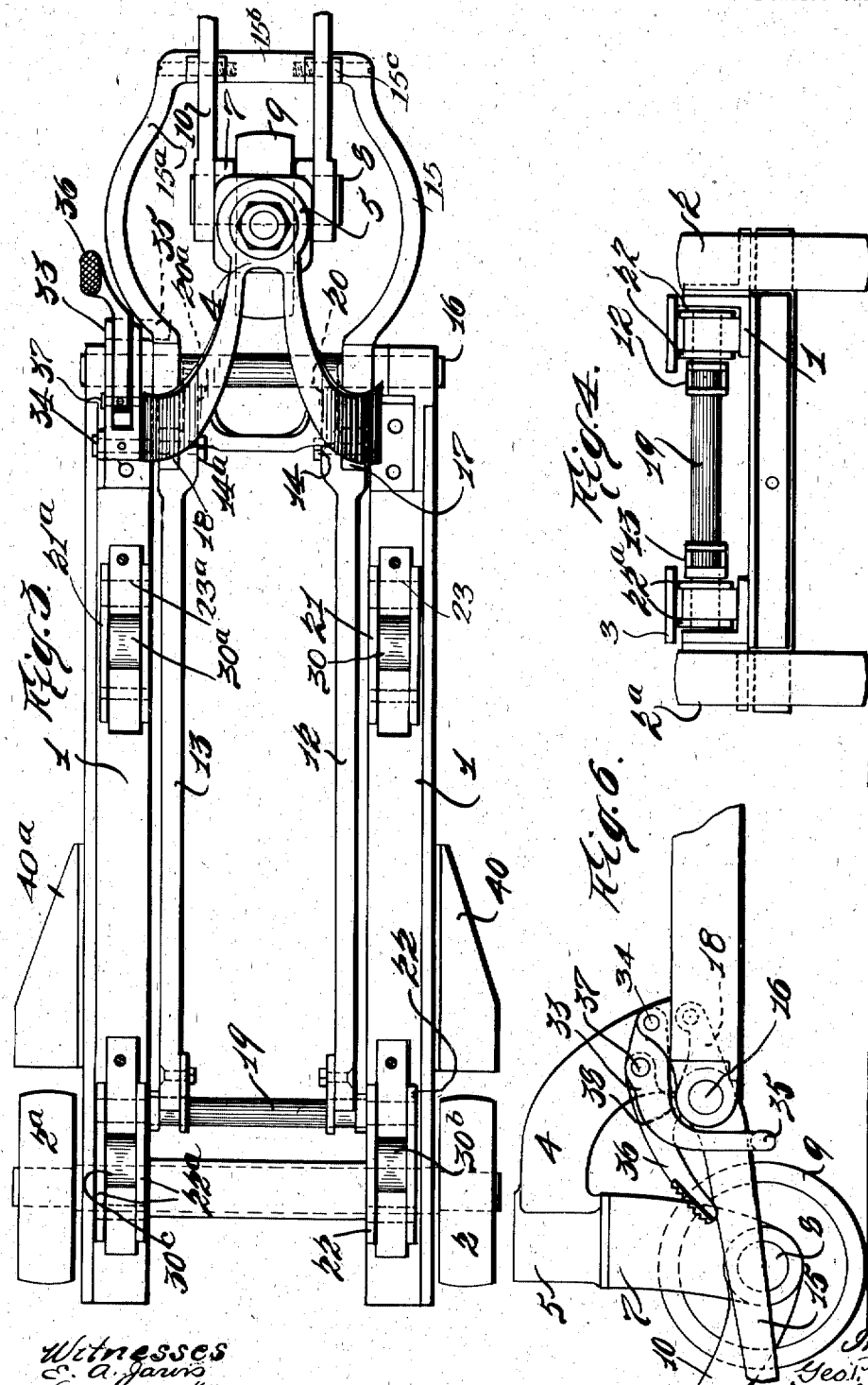

GEORGE P. TAYLOR, OF HOLYOKE, MASSACHUSETTS, ASSIGNOR, BY MESNE ASSIGNMENTS, TO HERBERT W. COWAN, J. LEWIS WYCKOFF, AND EDWARD N. WHITE, TRUSTEES, ALL OF HOLYOKE, MASSACHUSETTS.

TRUCK.

1,202,242.   Specification of Letters Patent.   Patented Oct. 24, 1916.

Application filed December 9, 1912. Serial No. 735,691.

*To all whom it may concern:*

Be it known that I, GEORGE P. TAYLOR, a citizen of the United States, residing at Holyoke, Massachusetts, have invented certain new and useful Improvements in Trucks, of which the following is a clear, full, and exact description.

This invention relates to improvements in trucks such as are used in warehouses, factories and stores, for the purpose of conveying goods or materials from one place to another, and which are adapted to raise a load from the floor and deposit it at another place.

The invention relates more particularly to the type of truck disclosed in my prior Patent #1,122,439, dated December 29, 1914, in which elevating means are provided for raising a platform, and the object of the invention is to improve and simplify such constructions so as to facilitate the operation of the elevating means and to provide a secure and stable locking means therefor when elevated.

A further object of the invention is to provide a convenient arrangement for elevating the platform from the steering handle of the truck and for controlling the lowering of the platform through said steering handle as a lever, the parts being so arranged that the beginning of the operator's stroke in elevating the platform is made more easy than in other devices of this character.

A further object of the invention is to provide a convenient and reliable manually operated trip mechanism which is adapted to release said elevating mechanism so that the load may be lowered onto the floor while under the control of the operator.

These being among the objects of the present invention, the same consists of certain features of construction and combinations of parts to be hereinafter described and then pointed out in the claims with reference to the accompanying drawings which illustrate a suitable embodiment of the invention, and in which—

Figure 1 is a longitudinal section of an improved truck of the present invention, the platform of the truck being in lowered position; Fig. 2 is a similar view, the platform of the truck being however in elevated position, a portion of the steering handle being omitted as is also the case with Fig. 1; Fig. 3 is a plan view of the truck, the upper platform and a portion of the operating handle being omitted; Fig. 4 is a view of the rear end of the truck; Fig. 5 is a side elevation of parts of the truck showing how the swinging yoke and its connections are limited in one direction and held in locked position; and Fig. 6 is a detail view of a portion of the truck illustrating the trip mechanism for releasing the elevated load.

Referring to the drawings, the base or truck body 1 of the truck is provided with a pair of wheels 2—2 which are preferably journaled thereon at the rear. Above the body or base 1 is a platform 3 on which the load is to be carried. Mounted for swinging movement between the truck body 1 and upper platform 3 are link members 21, 21ª, 22, 22ª, one at each of the four corners of said truck body for raising and lowering said platform through the mechanism hereafter described. At that end of the truck opposite the wheels 2, 2ª said base or body is provided with a bracket 4 having an upright sleeve 5 in which is swiveled the spindle 6 of a fork 7, forming a fifth wheel device for steering the truck. Between the ends of the fork 7 is mounted an axle 8 of a steering wheel 9. The said axle 8 is extended sufficiently at each side of the caster wheel so that bifurcations 10 of a handle or tongue 11 may have bearing on said axle, to enable the handle to be used as the main operating member of the mechanism, both to eventually elevate or lower the platform and to steer the truck by reason of the swivel connection 5, 6.

The preferred means for elevating the platform from the base is as follows: Mounted for swinging movement vertically, that is, in a vertical plane between the upper and lower portions of the truck but not necessarily directly connected to either, are the links 21, 21ª, 22 and 22ª. There are preferably two links 21 21ª at the front and two links 22 22ª at the rear of the truck, and in the present embodiment each link such as 21 22 is pivotally connected to the upper platform as at 23 19 and has a sliding pivotal connection with the lower truck body through pivots such as 27, 27ª and slotted guides 28 29.

The links 21, 21ª, 22 and 22ª each carry intermediate their ends a roller or pin 30, 30ª, 30ᵇ, 30ᶜ adapted to be engaged by cam surfaces or wedges such as 26, 32, one for each link, when moved relatively thereto. In the present preferred embodiment the wedges 26, 32, are fixed to the lower truck body and each wedge is also formed with the longitudinal guide slots such as 28, 29, below its inclined face for receiving the pin 27 of its associated link 21. Each of said pivots 27, 27ᵃ is movable longitudinally of the body or base 1, being guided in said slots 28 and 29. The inclined guide surfaces or faces of the wedges 26 and 32 may be slightly concave as shown.

A link operating device preferably in the form of a yoke with side members 15, 15ᵃ, and an upper cross bar 15ᵇ is pivoted at 16 on the base of the truck. Said link operating device also has short arms 17 and 18 pivotally connected at 14, 14ᵃ, with connecting rods 12 and 13 respectively, said rods in turn being connected at their rearward ends to the upper ends of the rear swinging links 22 and 22ᵃ through pivot rod 19. In this way the yoke 15 through its connections, may be operated to swing the links 22, 22ᵃ, etc., upwardly and raise the platform 3, and said yoke 15 may be operated from the steering handle 11, as follows. As shown in Figs. 1, 2 and 3, the steering handle 11 is provided with a lower bifurcated portion 10 having a cam face 10ᵃ adapted to bear against the cross bar 15ᵇ of the yoke 15, so that when said lever 11 is swung downwardly from the position shown in Fig. 1 to the position shown in Fig. 2, the yoke 15 will also be rocked on its pivot 16 to elevate the platform and swing the links, as above described. Rollers 15ᶜ are preferably provided as shown at the connection between the handle 11 and the yoke 15 to furnish an anti-frictional bearing between the cam face 10ᵃ and the cross bar 15ᵇ of the yoke.

It will be observed that the yoke 15, through its connection to the elevating links 21, etc., of the platform, swings in definite fixed relation to said swinging links, so as to be in the position shown in Fig. 1 when the platform is down and conveniently located for engagement by the handle 11 in its downward sweep for elevating the platform, and in the position shown in Fig. 2 when the platform is up so as to be controlled by the upward sweep of the handle in lowering the platform. It is obvious that the handle and its portion 10 may be held in continuous engagement with the yoke 15 both for effecting the elevation of the platform and controlling its descent, and that said handle may also be disengaged from said yoke and moved laterally thereof, for steering the truck.

The yoke and its connections are arranged to be self-locking when moved into the position shown in Fig. 2, by means of an extending toe 20, 20ᵃ, on each rod 12 and 13, which abuts against some stationary part or stop of the base frame, such as the pivot shaft 16. This prevents the yoke 15 from swinging farther in a downward direction, and since the pivotal connection 14 is above the line joining the centers 19 and 16, a load on the platform 3 will tend to hold the parts in this locking position.

The yoke 15 being pivoted as shown on the base 1, and also connected with the platform ends of the links 21, etc., operates when swung to move said links and the wedges 26, 32, relatively to one another, so that the initial upward movement of said links is brought about by the coaction of the wedges 26, 32, against the pins 30, 30ᵇ, etc., of said links. When the platform is down and the links 21, etc., are nearly in line with the rods 12 and 13 as shown in Fig. 1, it is obvious that the force from the rods 12 and 13 delivered to the platform ends of the swinging links is not as effective in raising said links at the beginning of their upward movement as is the force of the wedges acting on the intermediate pins of said links. In other words, the turning moment imparted to said links by the wedges 26, 32, is greater than that imparted by the rods, during the initial movement of said links upwardly. The force of the rods 12, 13, however, increases in effectiveness as the links are raised.

This arrangement of two sets of devices,— one set being the wedges and the other set being the rods,—for acting on the elevating links, facilitates the raising of the platform from a position in which said links are substantially horizontal, as shown in Fig. 1, and moreover makes it easier for the operator at the steering handle. It is more difficult for the operator to apply his power to the steering handle when the latter is in its vertical position as shown in Fig. 1, than when the load is partly elevated, and this difficulty is compensated, partly at least, by the action of the two sets of devices above described.

To understand the operation of my device more fully, it will be well to refer to Figs. 1 and 2. In Fig. 1 the platform is in lowered position, in which position the pairs of links 21 21ᵃ and 22 22ᵃ are moved into a position substantially parallel with and between the base 1 and the platform, 3, and the pivots 27 27ᵃ of the said links are located, in this position of the parts of the truck, at the forward ends of the guide slots 28, 29. When the platform is raised as in Fig. 2, the links 21, etc., will be in a position angular to the planes of the base and the platform, said platform having been shifted in a plane which is parallel with the plane of the base, and the pivots 27 27ᵃ of said links being then located at the rear ends of said guide slots 28 and 29. Further, in the position shown in Fig. 1, the rollers 30, etc., will be located at the lower ends of the inclines 26, etc., while in the position shown in Fig. 2, they will be located at the upper ends or beyond said inclines. Or, if sufficient motion is applied through the swinging device 15 said rollers may leave the inclines and swing through arcs having pivots such as 27 as a center.

The operation is as follows: The operator moves the handle 11 down, thus imparting a horizontal movement to the platform 3, through the medium of the described mechanism or any other suitable connecting mechanism. The said platform is not merely shifted horizontally but the links and platform which are connected to the base by said links, are moved from the position shown in Fig. 1 to the position shown in Fig. 2, said platform being thereby elevated. It is obvious that in moving the platform from the position shown in Fig. 1 to Fig. 2 the pivots 27 27$^a$ shift gradually along the guide slots 28, 29 and the rollers 30 30$^b$ rise gradually along the inclined wedge faces 26 and 32 so that the said links 21, 22, etc., are bodily shifted relatively to the base 1 and turn on said pivots 27, etc., with the result that the platform is gradually elevated.

The swinging device 15 and its connections are released from their locking position when the platform is raised by means of tripping mechanism shown in Figs. 3 and 6. A pressure device or arm 33 is pivoted at 34 to the body or base 1 of the truck, and the same is provided with a depending hook 35 which is located adjacent but in advance of the fulcrum 16 of the yoke 15, so as to engage the underside of the same as shown in Fig. 6. For actuating said pressure device 33, a treadle or lever 36 is pivoted at 37 to said device 33 and is provided with a knuckle or fulcrum portion 38 which, when pressure is applied to said treadle or lever by the operator, bears upon some stationary portion of the base adjacent to pivot 16, for a fulcrum to thereby swing said pressure device 33 upwardly against the yoke 15. The pivot 14 is shifted thereby below the line joining the centers 19 and 16 sufficiently to break the parts from locking position and the operator may control the lowering of the load, by handle 10.

Preferably applied to the sides of the rear end of the truck and just in advance of the wheels 2 2$^a$, are guards 40 40$^a$ which protect the said wheels and prevent them from coming in contact with an obstruction.

Obviously the described truck is susceptible of modification, as parts may be omitted, parts added and parts altered without changing the principle of the device.

What I claim as new is:—

1. In an elevating truck in combination, a base member, and a platform member, links mounted for swinging movement between said base and platform members to provide for an up and down movement of said platform, said links having connections adapted for pivotal movement with both said base member and said platform member, the connections of said links with one of said members being also slidable, wedges located between said platform and said base members, for coacting with said links in raising said platform member, and means for moving said links and wedges relatively to one another.

2. In an elevating truck, in combination, a base, supporting wheels therefor, elevating means comprising swinging links mounted on said base for up and down swinging movement, two sets of devices arranged to act on said links for swinging the same upwardly, one set of devices adapted to impart a greater turning moment to said links at the beginning of their upward movement than the other set of devices, and means for operating both sets of devices to swing said links upwardly.

3. In an elevating truck, in combination, a base, supporting wheels therefor, a steering device, a steering handle for manipulating said steering device in guiding the truck, elevating means comprising swinging links mounted on said base for up and down swinging movement, two sets of devices arranged to act on said links for swinging the same upwardly, one set of devices adapted to impart a greater turning moment to said links at the beginning of their upward movement than the other set of devices, and means for operating both sets of devices from said steering handle to swing said links upwardly.

4. In an elevating truck, in combination, a base, supporting wheels therefor, a platform, means for elevating said platform from said base comprising swinging links having pivotal connections with said base and said platform, two sets of devices arranged to act on said links for swinging the same and elevating the platform, one set of devices adapted to impart a greater turning moment to said links at the beginning of their upward movement than the other set of devices, and means for operating both sets of devices to swing said links and elevate said platform.

5. In an elevating truck, in combination, a base, supporting wheels therefor, a platform, means for elevating said platform from said base comprising swinging links having pivotal connections at their ends with said base and said platform, two sets of devices arranged to act on said links for swinging the same and elevating the platform, one set comprising wedges arranged to act on said links at a point removed from their pivotal connections to said base, the other set comprising connecting rods arranged to act on the platform ends of said links, said wedges adapted to impart a greater turning moment to said links at the beginning of their upward movement than said connecting rods, and means for operating both said rods and said wedges to swing said links and elevate said platform.

6. In an elevating truck, in combination, a base, supporting wheels therefor, a platform, means for elevating said platform from said base, comprising vertically swinging links mounted between said platform and base, wedges arranged to act against said links at a point removed from one end thereof so as to raise the other ends of said links and elevate said platform when said wedges and links are moved relatively to one another, and means for moving said links and wedges relatively to one another.

7. In an elevating truck, in combination, a base, supporting wheels therefor, a platform, means for elevating said platform from said base comprising vertically swinging links having pivotal connections at one end with said base and at their other ends with said platform, pins on said links intermediate the ends thereof, wedges mounted on said base and arranged to act against the intermediate pins on said links to lift the same when said links and wedges are moved relatively to one another, and means for moving said links and wedges relatively to one another for elevating said platform.

8. In an elevating truck in combination, a base, supporting wheels therefor, a steering device, elevating means comprising links mounted to swing up and down on said base, and a link-operating device swinging at all times with said links so that it is in one predetermined position when said links are up and in another predetermined position when said links are down, hand-operated means for effecting the raising and controlling the lowering of said elevating means, said hand-operated means arranged to directly and continuously engage said link-operating device during both the raising and lowering of the elevating means and being disengageable from said link-operating device and movable laterally thereof for steering said truck.

9. In an elevating truck in combination, a base, supporting wheels therefor, a steering device, elevating means comprising links mounted to swing up and down on said base, and a link-operating device swinging at all times with said links so that it is in one predetermined position when said links are up and in another predetermined position when said links are down, hand-operated means for effecting the raising and controlling the lowering of said elevating means, said hand-operated means having a connection with said steering device and arranged to directly and continuously engage said link-operating device during both the raising and lowering of said elevating means, and being disengageable from said link-operating device so as to move with said steering device laterally of said link-operating device in steering said truck.

10. In an elevating truck in combination, a base, supporting wheels therefor, a steering device, elevating means comprising links mounted to swing up and down on said base, and a link-operating device swinging at all times with said links so that it is in one predetermined position when said links are up and in another predetermined position when said links are down, hand-operated means for effecting the raising and controlling the lowering of said elevating means, said hand-operated means having a connection with said steering device and arranged to directly and continuously engage said link-operating device during both the raising and lowering of said elevating means, and being disengageable from said link-operating device so as to move with said steering device laterally of said link-operating device in steering said truck, and a stop on said base arranged to coact with said elevating means to maintain the same locked in upper position when raised.

11. In an elevating truck in combination, a base, supporting wheels therefor, an upright extension at one end of said base providing a fixed steering head, a steering device swiveled in said head, elevating means comprising links mounted to swing up and down on said base, and a link-operated device swinging at all times with said links so that it is in one predetermined position when said links are up and in another predetermined position when said links are down, hand-operated means for effecting the raising and controlling the lowering of said elevating means, said hand-operated means having a connection with said steering device, and arranged to directly and continuously engage said link-operating device during both the raising and lowering of said elevating means, and being disengageable from said link-operating device so as to move with said steering device laterally of said link-operating device in steering said truck.

12. In an elevating truck in combination, a base, supporting wheels therefor, a steering device, elevating means comprising links mounted to swing up and down on said base, and a link operating yoke formed with side members and an upper connecting cross member, said yoke swinging at all times with said links so that it is in one predetermined position when said links are up and in another predetermined position when said links are down, hand-operated means for effecting the raising and controlling the lowering of said elevating means, said hand-operated means having a connection with said steering device, and arranged to directly and continuously engage the upper cross member of said yoke during both the raising and lowering of said elevating means, and being disengageable from said yoke so as to move with said steering device laterally of said yoke in steering said truck.

13. In an elevating truck in combination, a base, supporting wheels therefor, a steering device, elevating means comprising links mounted to swing up and down on said base, and a link-operating yoke formed with side members and an upper connecting cross member, said yoke swinging at all times with said links so that it is in one predetermined position when said links are up and in another predetermined position when said links are down, hand-operated means for effecting the raising and controlling the lowering of said elevating means, said hand-operated means having a connection with said steering device, and arranged to directly and continuously engage the upper cross member of said yoke during both the raising and lowering of said elevating means, and being disengageable from said yoke so as to move with said steering device laterally of said yoke in steering said truck, and a stop on said base arranged to coact with said elevating means to maintain the same locked in upper position when raised.

14. In an elevating truck in combination, a base, supporting wheels therefor, a steering device, elevating means comprising links mounted to swing up and down on said base, and a link-operating device swinging at all times with said links so that it is in one predetermined position when said links are up and in another predetermined position when said links are down, hand-operated means for effecting the raising and controlling the lowering of said elevating means, said hand-operated means having a connection with said steering device, and arranged to directly and continuously engage said link-operating device during both the raising and lowering of said elevating means, and being disengageable from said link-operating device so as to move with said steering device laterally of said link-operating device in steering said truck, a stop on said base arranged to coact with said elevating means to maintain the same in locked position when raised, and a manually-operated tripping device arranged to release said elevating means from its upper locked position and allow the same to descend.

Signed at Holyoke this 20th day of November, 1912.

GEORGE P. TAYLOR.

Witnesses:
G. A. WILMS,
JAMES F. O'NEILL.

Correction in Letters Patent No. 1,202,242.

It is hereby certified that in Letters Patent No. 1,202,242, granted October 24, 1916, upon the application of George P. Taylor, of Holyoke, Massachusetts, for an improvement in "Trucks," an error appears in the printed specification requiring correction as follows: Page 4, line 102, claim 11, for the compound word "link-operated" read *link-operating;* and that the said Letters Patent should be read with this correction therein that the same may conform to the record of the case in the Patent Office.

Signed and sealed this 28th day of November, A. D., 1916.

[SEAL.]

F. W. H. CLAY,
*Acting Commissioner of Patents.*

Cl. 254—10.